(12) United States Patent
Wedley

(10) Patent No.: US 8,179,655 B2
(45) Date of Patent: May 15, 2012

(54) SURGE PROTECTION APPARATUS AND METHODS

(75) Inventor: Timothy Craig Wedley, Barnaderg (IE)

(73) Assignee: Pulse Electronics, Inc., San Diego, CA (US)

( * ) Notice: Subject to any disclaimer, the term of this patent is extended or adjusted under 35 U.S.C. 154(b) by 565 days.

(21) Appl. No.: 12/079,835

(22) Filed: Mar. 28, 2008

(65) Prior Publication Data

US 2009/0244800 A1    Oct. 1, 2009

(51) Int. Cl.
*H02H 9/04*  (2006.01)
*H02H 3/22*  (2006.01)

(52) U.S. Cl. ........... 361/119; 361/118; 361/56; 361/111

(58) Field of Classification Search .................. 361/119, 361/56, 111, 118
See application file for complete search history.

(56) References Cited

U.S. PATENT DOCUMENTS

| | | | |
|---|---|---|---|
| 4,023,066 A * | 5/1977 | Smulders .................. 315/209 R |
| 4,112,418 A | 9/1978 | Ishikawa et al. |
| 4,132,915 A * | 1/1979 | Wilms .......................... 313/325 |
| 5,086,368 A | 2/1992 | Gerke et al. |
| 5,327,318 A | 7/1994 | Popat et al. |
| 5,353,189 A * | 10/1994 | Tomlinson .................... 361/118 |
| 5,734,542 A | 3/1998 | Cohen |
| 5,747,981 A * | 5/1998 | Callanan ....................... 323/362 |
| 5,880,919 A | 3/1999 | Napiorkowski et al. |
| 5,909,349 A | 6/1999 | Brower et al. |
| 6,133,079 A * | 10/2000 | Zhu et al. ...................... 438/210 |
| 6,404,347 B1 | 6/2002 | Kiko |
| 6,472,992 B1 | 10/2002 | Kiko |
| 6,642,827 B1 | 11/2003 | McWilliams et al. |
| 6,671,155 B2 | 12/2003 | Bennett et al. |
| 6,687,109 B2 | 2/2004 | Bennett et al. |
| 6,775,117 B2 * | 8/2004 | Wodrich et al. ................. 361/56 |
| 6,853,724 B2 * | 2/2005 | Wang ....................... 379/387.02 |
| 7,057,486 B2 | 6/2006 | Kiko |
| 7,489,225 B2 | 2/2009 | Dadafshar |
| 7,567,163 B2 | 7/2009 | Dadafshar |
| 7,598,837 B2 | 10/2009 | Gilmartin |
| 2006/0063314 A1 | 3/2006 | Hokazono |

OTHER PUBLICATIONS

Don Lancaster, Active-Filter Cookbook, 1975, SAMS, pp. 10-13.*
Electromagnetic Interference: Coupling Mechanisms, 2007, http//www.answers.com/topic/electromagnetic-compatibility.*

* cited by examiner

*Primary Examiner* — Rexford N Barnie
*Assistant Examiner* — Zeev V Kitov
(74) *Attorney, Agent, or Firm* — Gazdzinski & Associates, PC

(57) ABSTRACT

Improved over-voltage protection apparatus and associated methods useful in e.g., telecommunications applications. In one embodiment, the over voltage protection apparatus comprises a gas discharge tube, common mode inductor, coupled inductor, secondary over-voltage protection device, filter circuitry, coupled inductor and common mode inductor. In one embodiment the over voltage protection apparatus comprises a gas discharge tube, common mode inductor, coupled inductor, secondary over-voltage protection device and filter circuitry. The arrangement of said inductive components being optimally connected in such a manner as to provide a high impedance circuit for all surge events to the gas discharge tube, so as to protect the filtering circuitry. Methods for the manufacture of the filter protection apparatus so as to be maximally independent of component tolerances are also disclosed.

25 Claims, 13 Drawing Sheets

SURGE PROTECTION APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Field of the Invention

The present invention relates generally to the field of surge protection in electronic devices for use in, for example, telecommunications applications.

2. Description of Related Technology

The term "Plain Old Telephone Service" (POTS) refers generally to the voice-grade telephone service used for residential and small business service connection telephone network. The name is a reflection of the simple circuit-switched telephone service still available after the advent of more advanced forms of telephony such as Integrated Services Digital Network (ISDN), mobile phones and VoIP (Voice over Internet Protocol).

Advances in communications circuits of the Public Switched Telephone Network (PSTN) continue to be made; however, the majority of these improvements are with regard to sound quality. The function of the POTS local loop presented to the customer for connection to telephone equipment is practically unchanged. Due to the wide availability of POTS, more recent forms of communications devices such as modems and facsimile machines are designed to use the POTS service to transmit digital information.

The pair of wires from the central switch office to a subscriber's home is called a subscriber loop. It is typically powered by −48V direct current (DC) and backed up by a large bank of batteries (connected in series) in the central office, resulting in continuation of service during most commercial power outages. The pair of wires of the subscriber loop is commonly referred to as "tip" and "ring". Where the "tip" terminal refers to the ground side (positive) and "ring" terminal is the powered (negative) side of a phone circuit. The naming convention originated from the phone operator's plug, the "tip" being the tip of the plug, the "ring" being the ring of the plug, although this is by no means determinative or restricting. The subscriber loop typically carries a "load" or impedance of about 600 Ohms.

Advances have been made to extend the usefulness of the POTS network by piggybacking higher data rate technologies onto it. The original POTS network was designed for transmitting voice quality signals, it was only intended to handle between 0 and 4 kHz frequency signals. This is a relatively narrow bandwidth given the data traffic demands of consumers which are in use today. DSL and its variants, popularly termed xDSL, typically work by dividing the frequency spectrum available in a single phone line into multiple bands or spectral portions. The media data is carried over a high frequency band (typically on the order of 25 kHz and above), whereas voice data is carried over a lower frequency band (typically about 4 kHz and below). The user typically installs a filter on each phone, also commonly referred to as a splitter. The splitter filters out the high frequency band from the phone for the audible content of the transmission (voice data). In this manner, DSL modems can operate simultaneously with the telephony device, without interfering with the audible quality of the terminal.

These PSTN-based devices are exposed to multiple electrical hazards in many modern telecommunications applications such as 60 Hz/120V or 50 Hz/230V AC mains, 90V telephone ring signals and lightning strikes among others. Accordingly, various additions of surge protection circuitry are exhibited in the prior art. For example, U.S. Pat. No. 4,112,418 to Ishikawa, et al. issued Sep. 5, 1978 and entitled "Lightning current responsive alarm" discloses a lightning current responsive alarm device in which an earthed discharge current circuit consisting of a parallel combination of a non-linear resistor and an inductive impedance element is connected between a protective co-ordination gap in a power transmission system and earth. In the device, a capacitor is charged up with the drop voltage appearing across the non-linear resistor, and a sensor or counter is actuated by the discharge current of the capacitor, so that the device can operate with a greatly widened operating range which covers a large current region of lightning current.

U.S. Pat. No. 5,086,368 to Gerke, et al. issued Feb. 4, 1992 and entitled "Connector bank with voltage surge protection" discloses a connector bank with two rows of insulation displacement contacts for connecting insulated conductors, in particular of cables for telecommunication and data systems, comprising a surge arrester magazine to be inserted into the connector bank. In order to provide a connector bank having a voltage surge protection and allowing connecting and disconnecting as well as testing the attached cable conductors at the insulation displacement contacts even with inserted voltage surge protection, the two rows of insulation displacement contacts are arranged on different sides of the connector bank. An insulation displacement contact of the first row is connected over a connecting element with an insulation displacement contact of the second row. The surge arrester magazine is arranged laterally approximately centrally between the two rows of insulation displacement contacts.

U.S. Pat. No. 5,327,318 to Popat, et al. issued Jul. 5, 1994 and entitled "Telecommunication equipment protector" discloses a surge protection device adapted to protect telecommunication equipment coupled to telephone lines. In a first embodiment, three cells with each cell having a semiconductor element with a reverse breakdown PN junction mounted on a heat sink is illustrated. The device includes a lead frame having a first pair of leads formed with a platform raised out of the plane of the remainder of the lead frame to provide suitable clearance relative to the semiconducting elements and each platform has a finger extending downwardly into engagement with a top electrode of a respective semiconducting element and is soldered thereto. A second lead lies in the plane of the lead frame and is soldered to a first heat sink plate mounting two semiconducting elements and another finger extending from one of the platforms is soldered to a second heat sink plate mounting the third semiconducting element. The heat sinks, semiconducting elements and portions of the leads are encapsulated in thermally conductive, electrically insulative epoxy. The device, when subjected to excessive current and voltage conditions, is adapted to fail closed. A second embodiment has two cells mounted on a single heat sink plate mounted in the same manner as in the first embodiment.

U.S. Pat. No. 5,734,542 to Cohen issued Mar. 31, 1998 and entitled "Dual-line dual-voltage telecommunications surge protector" discloses a surge protection module which provides surge protection for at least two telecommunications lines, with some wires of each telecommunication line being protected according to a first limiting voltage, and other the wires of the telecommunications line being protected according to a second limiting voltage.

U.S. Pat. No. 5,880,919 to Napiorkowski, et al. issued Mar. 9, 1999 and entitled "Gas tube surge protector with interacting varistors" discloses a surge protector that has a gas tube and at least one MOV that is coordinated with the gas tube such that the MOV interacts with the gas tube to lower the impulse breakdown voltage of a gas tube of a type that has a wide range of DC breakdown voltages across a population of the gas tubes. The gas tube is a generally cylindrical three element gas tube and the MOVs are disposed at opposite ends of the gas with fusible elements maintained in position by a clip. A population of the gas tubes has a range of breakdown voltages and the clamping voltage of the MOVs is set within this range such that the MOV will interact with any gas tube with a breakdown voltage in the population range to divert a surge to ground.

U.S. Pat. No. 5,909,349 to Brower, et al. issued Jun. 1, 1999 and entitled "Gas tube surge protector with sneak current protection" discloses a gas tube protector module that provides sneak current protection in addition to voltage surge protection. The module has two pairs of terminals with one pair for connection to outside plant and the second pair for connection to the inside wiring. The module has a gas tube with leads connected to the first pair of terminals. Positive temperature coefficient (PTC) resistors are disposed electrically between the lead and the second pair of terminals such that the PTCs are in series between the outside plant and the inside wiring.

U.S. Pat. No. 6,687,109 to Bennett, et al. issued Feb. 3, 2004 and entitled "Central office surge protector with interacting varistors" discloses a central office surge protector having at least one gas tube and at least one varistor. The at least one varistor interacts with the at least one gas tube to lower the impulse breakdown voltage of the gas tube. The at least one gas tube may be a two or a three element gas tube. Alternative embodiments of the surge protector further include at least one sneak current protection element.

U.S. Pat. No. 6,472,992 to Kiko issued Oct. 29, 2002 and entitled "Alarm filter circuit" discloses an alarm filter circuit used in telecommunication systems for interconnecting between incoming telephone lines and alarm unit located at a subscriber's premises so as to block DSL data signals to and from the alarm unit for preventing interference is provided. In one preferred embodiment, the alarm filter circuit includes a second-order low-pass filter section for blocking the DSL data signals to and from the alarm unit, a first-order high-pass filter section for bypassing the DSL data signals on the incoming telephone lines to the house wiring, and a first-order low-pass filter section for blocking high-frequency signals between the house wiring and the alarm unit. In a second embodiment, a fourth-order elliptical low-pass filter section replaces the second-order low-pass filter section. In a third embodiment, a third-order high-pass filter section replaces also the first-order high-pass filter section. In fourth through sixth embodiments, the first-order low-pass filter section is replaced by a second-order low-pass filter section. Further, the fourth through sixth embodiments includes surge protection circuitry for protecting the alarm unit from being damaged by transients. See also U.S. Pat. No. 6,404,347.

United States Patent Publication No. 20030103308 to Bennett, et al. published Jun. 5, 2003 and entitled "Surge protector with thermally activated failsafe mechanism" discloses a surge protector having a failsafe mechanism including at least one overvoltage protection element, at least one arm assembly, at least one ground element, at least one resilient member, and at least one protrusion. The at least one resilient member is electrically connected to the at least one ground element and the at least one protrusion is generally positioned between the at least one resilient member and the at least one arm assembly. The at least one protrusion is in thermal contact with the at least one resilient member, prevents the at least one resilient member from electrically contacting the at least one arm assembly during normal operation, and is spaced away from the at least one arm assembly. As a result of a sustained overvoltage condition, the temperature of the at least one resilient member increases thereby softening the at least one protrusion and allowing the at least one resilient member to electrically contact the at least one arm assembly to short the at least one arm assembly to the ground element.

Variations in telecommunications circuits within telecommunications devices can affect the operation of the surge protection elements present within these circuits. Telecommunication circuits often possess inherent protection against surge events via, for example, the construction of the inductive element(s). However, these inherent protection elements can also adversely affect the operation of the primary protection circuits by slowing or limiting the response of the primary protection to various surge events. Accordingly, co-ordination elements can be implemented within these telecommunications circuits that act as an element between the primary protection and the inherent protection of the circuit and prevent the inherent protection of the circuit from unduly affecting primary protection operation.

Despite the foregoing, there is a need for improved surge protection apparatus and methods for use in e.g. telecommunications devices. Ideally, such improved apparatus and methods would enable full compliance with over-voltage protection standards, as well as offer improved co-ordination by inter alia use of inductive components. By utilizing inductive filter elements as part of a coordination circuit, a circuit or device designer would be able to reduce the space requirements and component count, and therefore the overall size and cost of the device.

Ideally, such improved apparatus and methods would further be scalable, while also possessing the ability to provide double sided co-ordination.

SUMMARY OF THE INVENTION

The present invention satisfies the foregoing needs by providing an improved electrical assembly which is, among other things, flexible in its application and configuration.

In a first aspect of the invention, surge protection apparatus is disclosed. In a first embodiment, the surge protection apparatus comprises first over-voltage protection (OVP) circuit, a common mode inductor in series with the first OVP circuit, a coupled inductor in series with the common mode inductor and a second OVP circuit in series with the coupled inductor. The coupled inductor and the common mode inductor are adapted to trigger the first OVP circuit during both differential and common mode surge events.

In one variant, the first OVP circuit comprises a gas discharge tube.

In another variant, the second OVP circuit comprises one or more thyristor components.

In yet another variant, the surge protection apparatus is adapted for telecommunications applications.

In yet another variant, the surge protection apparatus further comprises a signal conditioning circuit disposed in series with the second OVP circuit. The arrangement of the first OVP circuit, common mode inductor, coupled inductor and second OVP circuit prevent differential and common mode surge events from damaging the signal conditioning circuit.

In yet another variant, the surge protection apparatus is compliant with the ITU-T k.45 standard.

In yet another variant, the one or more thyristor components comprises a single thyristor component.

In yet another variant, the one or more thyristor components comprises two thyristor components, with the two thyristor components sharing a node that is coupled to ground.

In yet another variant, the one or more thyristor components comprises three thyristor components, with two of the three thyristor components sharing a common node with the third of the three thyristor components, the third thyristor further comprising a node coupled to ground.

In a second embodiment, the surge protection apparatus comprises a first and a second primary over-voltage protection (OVP) circuit, a first and a second common mode inductor, a first and a second coupled inductor, a first and a second secondary OVP circuit and a signal conditioning circuit. The first secondary OVP circuit is disposed at a first side of the signal conditioning circuit and the second secondary OVP circuit is disposed at an opposite side of the signal conditioning circuit.

In one variant, the first primary OVP circuit is disposed at a first side of the signal conditioning circuit and the second primary OVP circuit is disposed at an opposite side of the signal conditioning circuit.

In yet another variant, the first common mode inductor is disposed at a first side of the signal conditioning circuit and the second common mode inductor is disposed at an opposite side of the signal conditioning circuit.

In yet another variant, the first coupled inductor is disposed at a first side of the signal conditioning circuit and the second coupled inductor is disposed at an opposite side of the signal conditioning circuit.

In yet another variant, the surge protection apparatus is compliant with the ITU-T k.45 standard.

In a second aspect of the invention, methods of manufacturing the aforementioned surge protection apparatus is disclosed. In one embodiment, the method comprises: forming a substrate comprising a plurality of signal paths; procuring a plurality of electronic components, the components comprising: a first over-voltage protection (OVP) circuit; a common mode inductor; a coupled inductor; a second OVP circuit; and a signal conditioning circuit; and placing the plurality of electronic components in electrical communication with at least a portion of the plurality of signal paths.

In one variant, the method further comprises procuring a signal conditioning circuit that comprises a telecommunication filter circuit.

In a third aspect of the invention, a method of protecting a signal conditioning circuit against an over voltage transient on a near-side input is disclosed. In one embodiment, the method comprises: providing a near-side primary over voltage protection (OVP) circuit; providing a near-side secondary OVP circuit; providing a far-side secondary OVP circuit; and coordinating the resistance of the signal conditioning circuit and the far-side secondary OVP circuit so as to trigger the near-side primary OVP circuit during the over voltage transient.

In one variant, the near-side OVP circuit comprises a gas discharge tube.

In another variant, the far-side secondary OVP circuit comprises one or more thyristor components.

In yet another variant, the over voltage transient may comprise a differential and/or a common mode surge event.

In a fourth aspect of the invention, an ITU-T k.45 standard-compliant telecommunications apparatus is disclosed. In one embodiment, the telecommunications apparatus comprises: a first over-voltage protection (OVP) circuit; a common mode inductor disposed in series with the first OVP circuit; a coupled inductor disposed in series with the common mode inductor; a second OVP circuit disposed in series with the coupled inductor; and a signal conditioning circuit. The coupled inductor and the common mode inductor are adapted to trigger the first OVP circuit during both differential and common mode surge events thereby protecting the signal conditioning circuit from surge events.

In one variant, the first OVP circuit comprises a gas discharge tube.

In another variant, the second OVP circuit comprises one or more thyristor components.

In a fifth aspect of the invention, methods of using the aforementioned surge protection apparatus is disclosed.

In a sixth aspect of the invention, systems incorporating the aforementioned methods and apparatus are disclosed. In one embodiment, the aforementioned methods and apparatus are included at a CO. In another embodiment, the aforementioned methods and apparatus are included as part of customer premises equipment (CPE). In yet another embodiment, the aforementioned methods and apparatus are included in a remote cabinet.

In a seventh aspect of the invention, business models relating to the aforementioned methods and apparatus are disclosed.

BRIEF DESCRIPTION OF THE DRAWINGS

The features, objectives, and advantages of the invention will become more apparent from the detailed description set forth below when taken in conjunction with the drawings, wherein.

DETAILED DESCRIPTION OF THE PREFERRED EMBODIMENT

Figure 1:
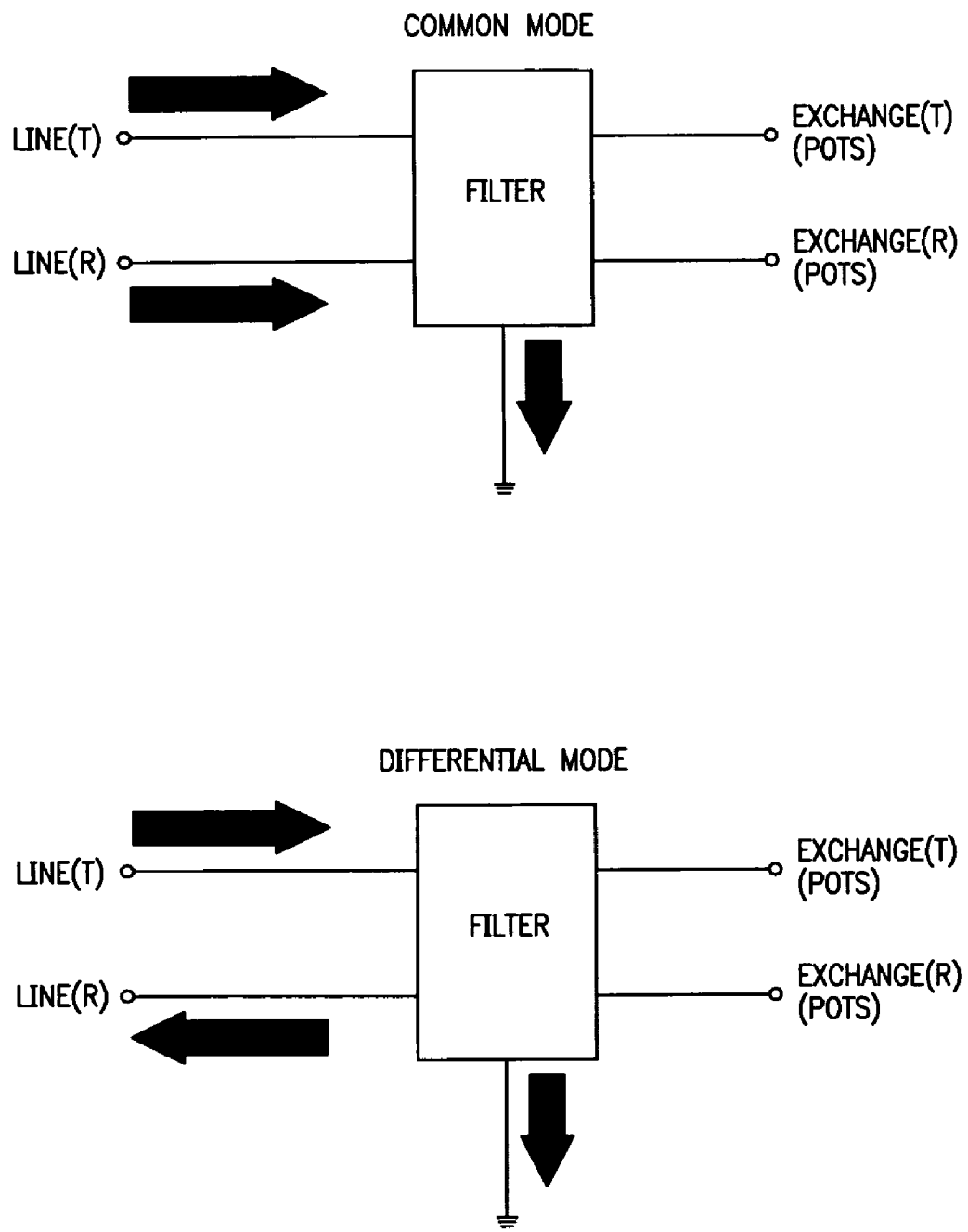
FIG. 1 is a block diagram illustrating two different surge modes that commonly afflict telecommunications circuitry.

Reference is now made to the drawings wherein like numerals refer to like parts throughout. It is noted that while the following description is cast primarily in terms of a Digital Subscriber Line (DSL) service loop (i.e. apparatus and methodology implemented at any point in the subscriber loop, whether at the Central Office (CO), remote cabinet or at the customer premises equipment (CPE) and adapted to separate a DSL signal from the POTS signal while providing over-voltage protection with co-ordination), the various aspects of the invention may be readily applied to other electronic devices where surge protection is needed or would otherwise be advantageous.

As used herein, the term "digital subscriber line" (or "DSL") shall mean any form of DSL configuration or service, whether symmetric or otherwise, including without limitation so-called "G.lite" ADSL (e.g., compliant with ITU G.992.2), RADSL: (rate adaptive DSL), VDSL (very high bit rate DSL), SDSL (symmetric DSL), SHDSL or super-high bit-rate DSL, also known as G.shdsl (e.g., compliant with ITU Recommendation G.991.2, approved by the ITU-T February 2001), HDSL: (high data rate DSL), HDSL2: (2nd generation HDSL), and IDSL (integrated services digital network DSL), as well as In-Premises Phoneline Networks (e.g., HPN).

It will further be recognized that while the terms "home", "consumer", "customer" and "subscriber" may be used herein in association with one or more aspects and exemplary embodiments of the invention, the invention is in no way limited to such applications. The present invention may be applied with equal success in, inter alia, small or large business, industrial, and even military/governmental applications if desired.

As used herein, the terms "electrical component" and "electronic component" are used interchangeably and refer to components adapted to provide some electrical function, including without limitation inductive reactors ("choke coils"), transformers, filters, gapped core toroids, inductors (coupled or otherwise), capacitors, resistors, operational amplifiers, and diodes, whether discrete components or integrated circuits, whether alone or in combination. For example, the improved toroidal device disclosed in Assignee's co-pending U.S. patent application Ser. No. 09/661,628 entitled "Advanced Electronic Microminiature Coil and Method of Manufacturing" filed Sep. 13, 2000, which is incorporated herein by reference in its entirety, may be used in conjunction with the invention disclosed herein.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, radio transceivers/chipsets, and other devices, as well as any combinations thereof.

As used herein, the term "network" refers generally to any system having two or more nodes that is capable of carrying data or other signals and/or power. Examples of networks include, without limitation, LANs (e.g., Ethernet, Gigabit Ethernet, etc.), WANs, PANs, MANs, internets (e.g., the Internet), intranets, HFC networks, etc. Such networks may comprise literally any topology (e.g., ring, bar, star, distributed, etc.) and protocols (e.g., ATM, X.25, IEEE 802.3, IP, etc.), whether wired or wireless for all or a portion of their topology.

As used herein, the term "signal conditioning" or "conditioning" shall be understood to include, but not be limited to, signal voltage transformation, filtering, current limiting, sampling, processing, conversion, and time delay.

Theory of Operation

Surge protection is a method whereby large unexpected voltage spikes are either blocked or shorted to ground. The effectiveness of surge protection is measured using two main paradigms, including: (1) effectiveness in energy absorption; and equally just as critical, (2) response time.

In typical use cases for cabinets used in xDSL applications, a Gas Discharge Tube ("GDT") is used as the primary over-voltage protection ("OVP") circuitry. As is well known, GDTs rely on a gas barrier present between two electrodes to become ionized by the high voltage, and conduct electrical current. A chief benefit of GDTs is that they can pass much more current per unit size than many other OVP components. Gas discharge tubes typically have exceptionally low capacitance, and are frequently the only voltage-sensitive clamping component that can be used directly in many high frequency lines.

However, as is known, a typical problem with GDTs is that they can take a relatively lengthy period of time to trigger. In certain circumstances, this relatively lengthy response may be mitigated by utilizing a high impedance component present in the signal path as slow response times can allow portions of the voltage spike to get past the GDT OVP circuitry. In one implementation, a 600V GDT will require a 1 kV 10/100 surge event to trigger its operation. Therefore, if there is a small impedance in series leading to ground, the GDT may not trigger until a significantly larger voltage is applied (e.g. greater than 4 kV). Given the magnitude of a voltage spike of greater than 4 kV, the instantaneous current spike can in some circumstances be in excess of 100 A. In cases where the instantaneous current spike is undesirable, GDTs by themselves will be insufficient and hence would not be the only form of OVP necessary.

One such example of an application where instantaneous current spikes are undesirable is in relation to International Telecommunication Union ("ITU") standard ITU-T k.45. ITU-T k.45 requires the signal conditioning circuitry to compensate for the slow reaction time of a GDT to sudden current spikes, thus requiring additional protection. Another standard applicable to, inter alia, surge protection requirements in the context of telecommunications equipment is the GR-1089-CORE standard, the contents of which are incorporated herein by reference in its entirety. In one aspect, the GR-1089-CORE standard specifies safety requirements for lightning and AC power fault conditions. Accordingly, it is desirable that a secondary OVP device be used to handle these quick surges in current that may be experienced in certain operating conditions in order to comply with these aforementioned standards. In one embodiment, a secondary OVP device comprises a well known thyristor, or alternatively a network of thyristors.

Figure 2A:
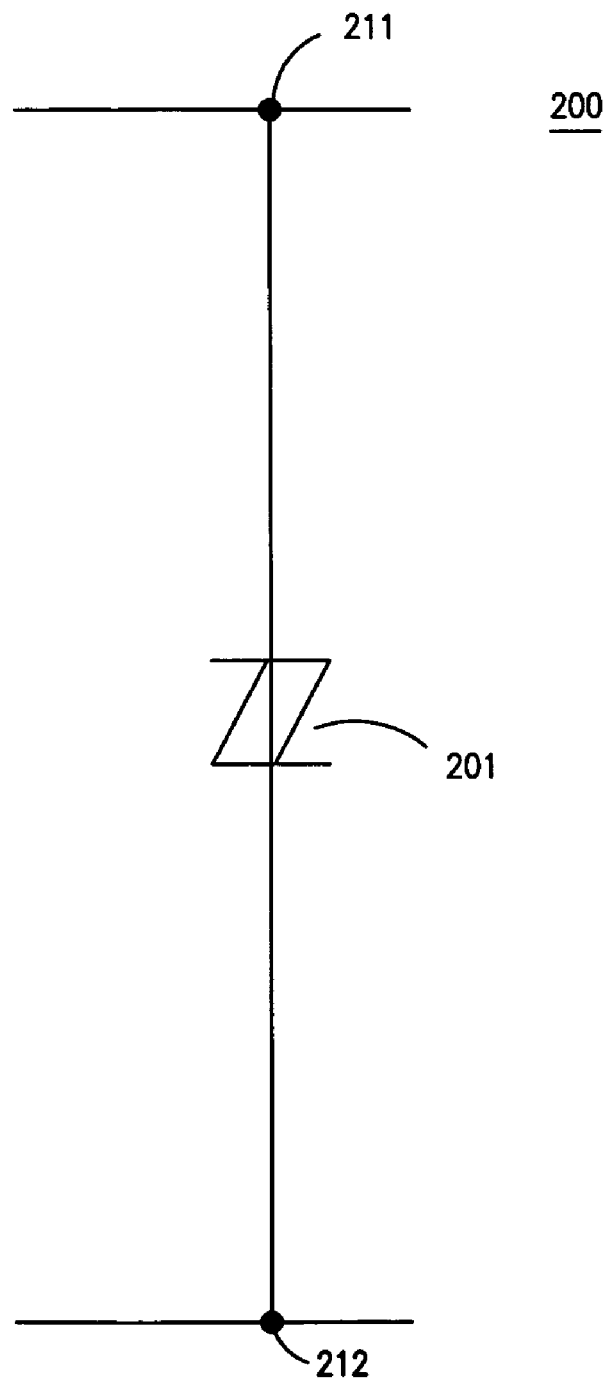
FIG. 2A is a schematic circuit diagram for a first embodiment of an over voltage protection circuit.
Figure 2B:
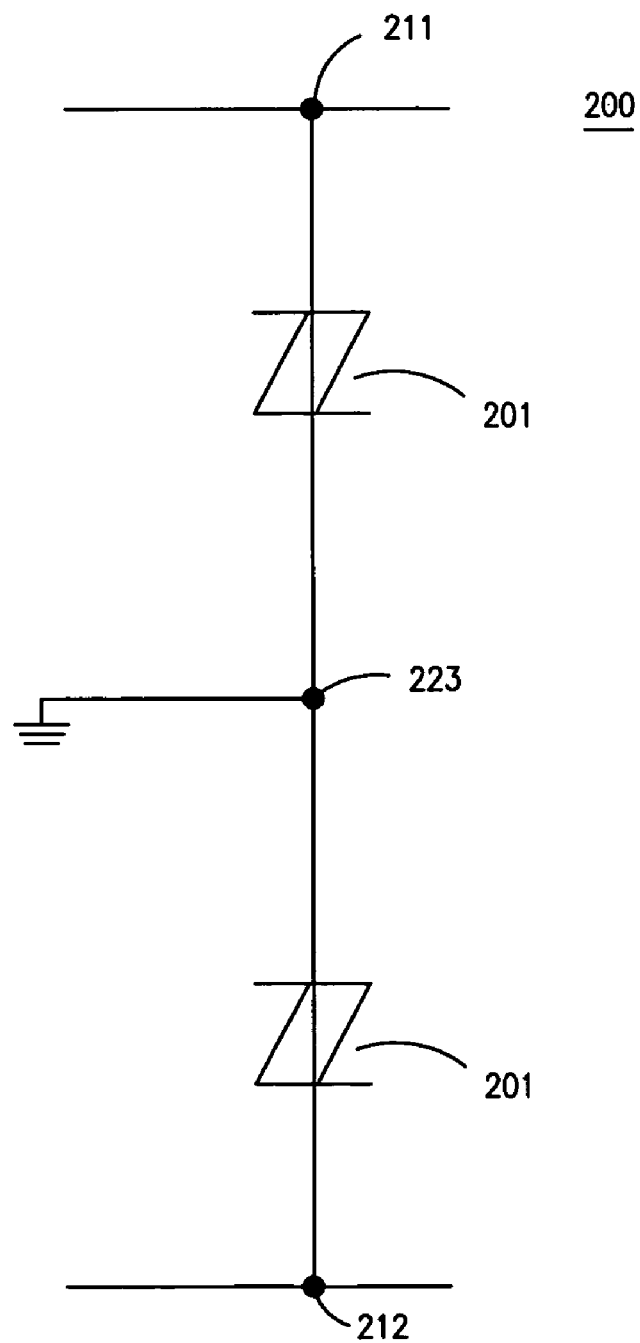
FIG. 2B is a schematic circuit diagram for a second embodiment of an over voltage protection circuit.
Figure 2C:
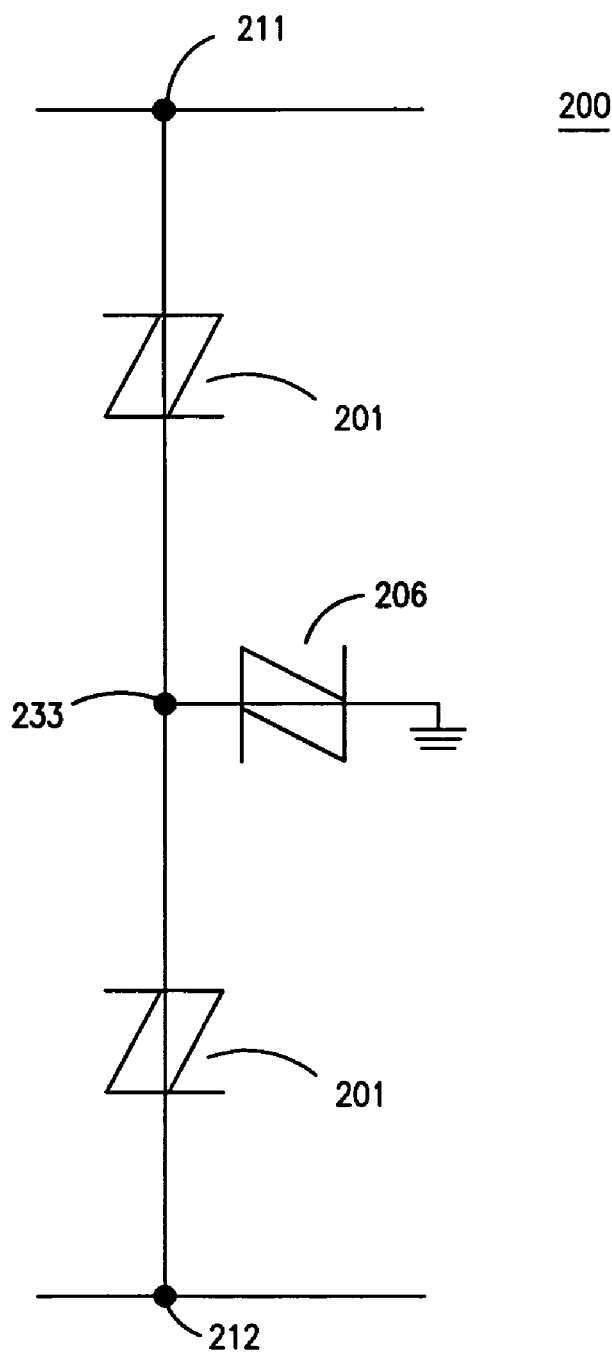
FIG. 2C is a schematic circuit diagram for a third embodiment of an over voltage protection circuit.
Figure 2D:
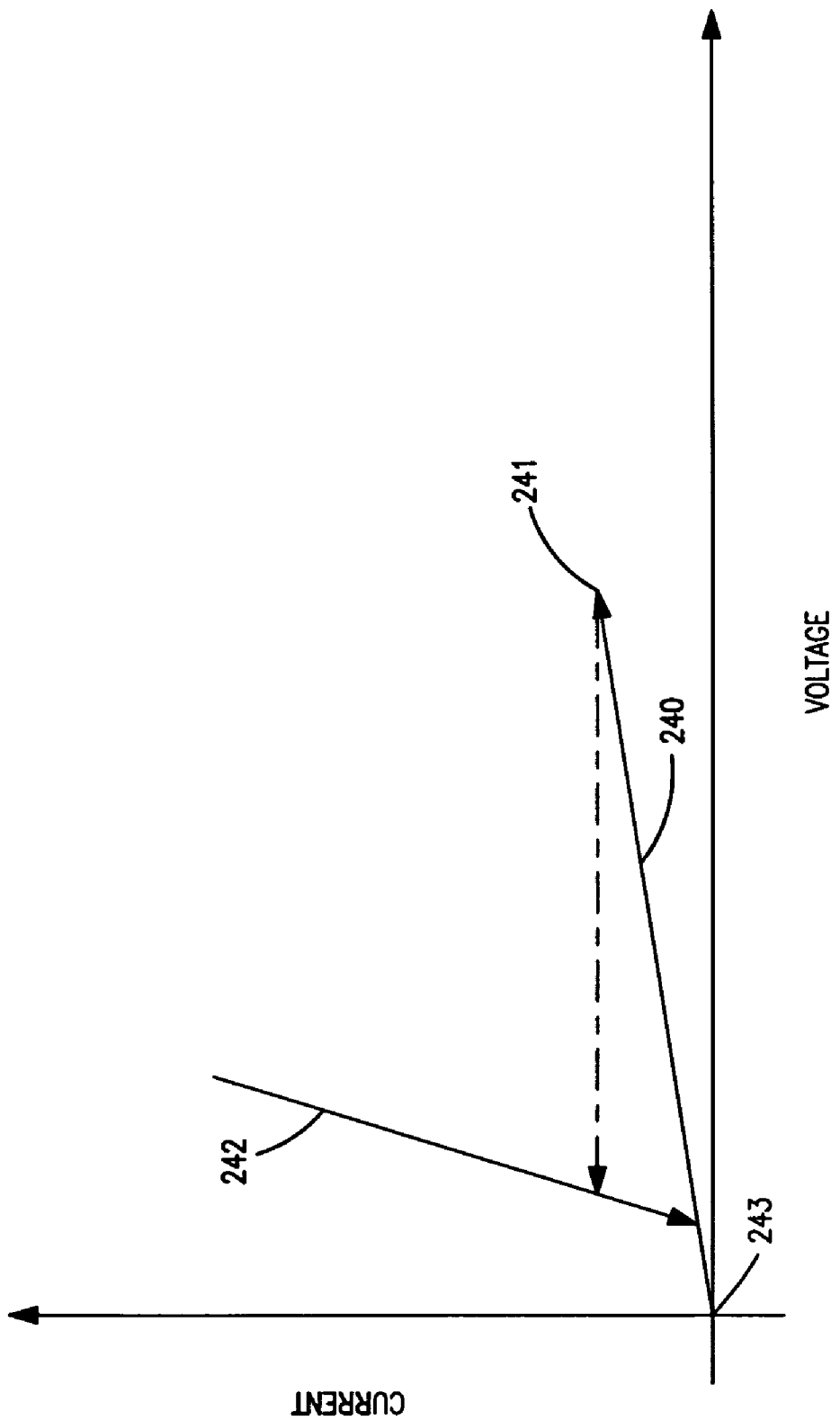
FIG. 2D is a plot of an ideal thyristor component operation as a function of voltage and current.

Thyristors can be modeled as a current latch element as shown in FIG. 2D. FIG. 2D illustrates a simplified ideal thyristor diagram, where initially the thyristor is on V-I curve 240. Once a thyristor has passed its "break-over" voltage 241, it latches, and conducts freely as illustrated in the curve 242.

If the current drops below the low current dropout 243, the latch is reset, and the thyristor returns to the V-I curve 240.

Two surge events are constrained by ITU-T k.45 and contemplated by dual conductor (i.e. tip and ring) devices generally. Referring again to FIG. 1, the first of the surge paths considered is the common mode path, also referred to as the "longitudinal" path. In the context of a telecommunications filter circuit as shown in FIG. 1, common mode surge events affect the tip and ring with currents in the same direction (although not necessarily of the same magnitude).

The second class of surge paths to be considered is the differential mode path, also commonly referred to as the "transverse" path. Differential mode surge events affect the tip and ring terminals with currents moving in opposite directions.

Referring to FIGS. 2A-2C, three (3) exemplary thyristor implementations are illustrated as will be discussed more fully herein below. It is recognized that other latch elements or latch element networks are possible; accordingly, the specific embodiments discussed herein should in no way be considered limiting on the broader principles of the invention.

In general, OVP circuit design has historically been a functional tradeoff between the capacities of a device to dissipate charge versus the physical response time of the device. A requirement specified by ITU-T k.45 is that the over-voltage protection (OVP) of the circuit will dynamically adjust to ensure that the most capable device for handling the surge is always used.

In the context of Applicant's present invention, the high current sunk by the secondary OVP latching elements (e.g. thyristors), and the high impedance necessary for the primary OVP (e.g., GDT) to trigger is joined together beneficially using inductive electronic components. Inductive electronic components, which alone are not helpful for power dissipation, are nevertheless useful when used in conjunction with primary and secondary OVP circuitry discussed herein. In principle, the inductive electronic components will advantageously present a relatively large impedance to a circuit, during large current changes. More precisely, the exemplary embodiments of the present invention use inductive electronic components, in co-ordination with secondary OVP structures, to ensure that there is always a sufficiently large impedance or voltage generated across the secondary OVP to trigger the primary OVP circuitry.

Three examples of inductor electronic components are utilized in the various embodiments of the present disclosure, which include: (1) common mode inductors ("CMI"); (2) inductive reactors; and (3) coupled inductors ("CI"). These may also be referred to colloquially as "chokes", or "choke coils". As is well understood in the electronic arts, inductive electronic components oppose fast changes in the amount of current. In one exemplary embodiment, the circuits hereafter described utilize inductive electronic components such as common mode inductors and coupled inductors that are four (4) terminal electrical components (Tip-Ring/Tip-Ring) constructed in such a manner that their windings either constructively or destructively combine their inductive effects, depending upon the direction of current travel at their terminals.

These inductive electronic components can be manufactured using any number of known techniques including, without limitation, coils of wire with or without the use of a core material, bobbin devices, printed circuit board inductors such as spiral inductors and the like, and active inductive devices such as positive impedance inverters (colloquially referred to as "gyrators"). See, e.g., the devices disclosed in co-owned U.S. Pat. No. 7,057,486 entitled "Controlled induction device and method of manufacturing"; co-owned and co-pending U.S. patent application Ser. No. 11/203,042 entitled "Stacked inductive devices and methods of manufacturing"; co-owned and co-pending U.S. patent application Ser. No. 11/213,461 entitled "Precision inductive devices and methods"; co-owned and co-pending U.S. patent application Ser. No. 10/990,915 entitled "Improved inductive devices and methods"; co-owned U.S. Pat. No. 6,642,827 to McWilliams, et al. issued Nov. 4, 2003 entitled "Advanced electronic microminiature coil and method of manufacturing"; and co-owned and co-pending U.S. patent application Ser. No. 10/885,868 entitled "Form-less electronic devices and methods of manufacturing", each of the foregoing of which is incorporated herein by reference in its entirety.

Figure 3:
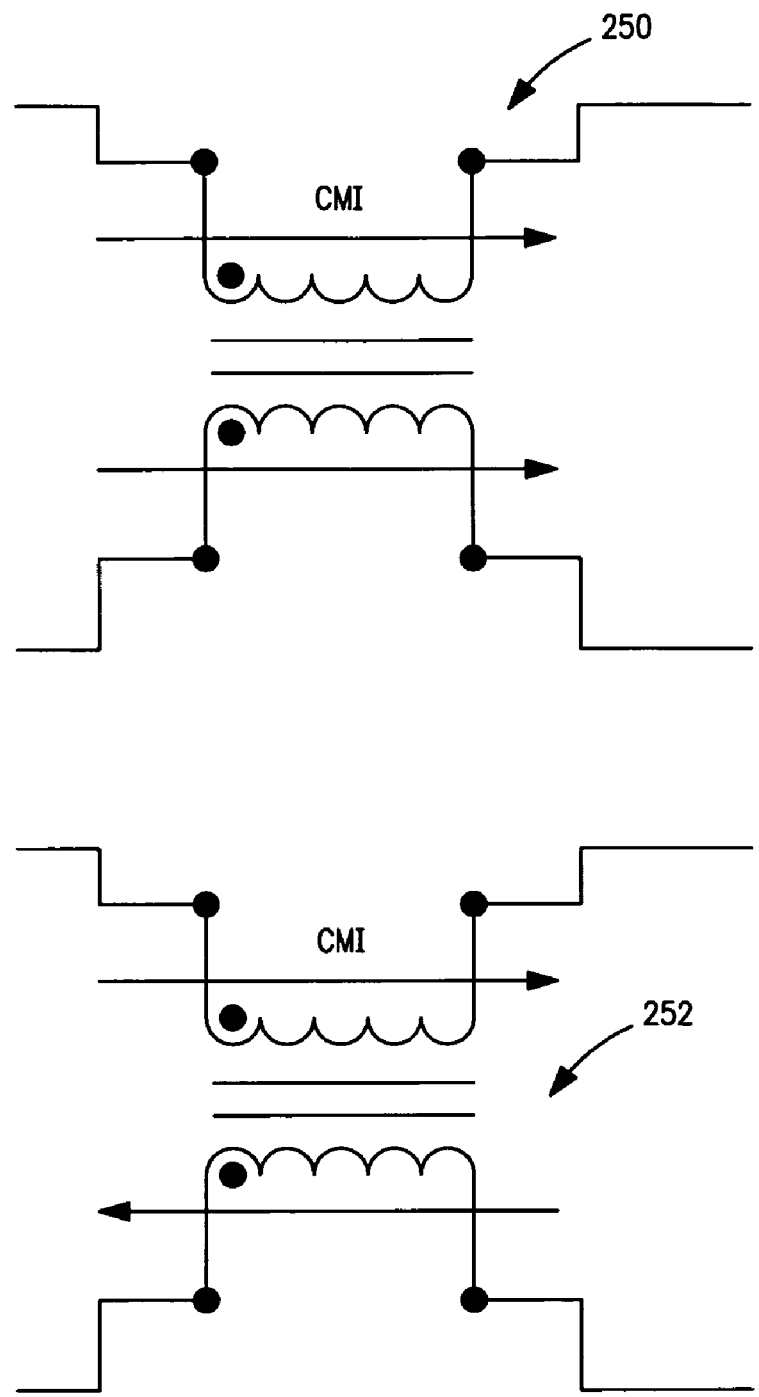
FIG. 3 is a schematic circuit diagram of a common mode inductor operating under the two surge modes described with regards to FIG. 1.
Figure 3A:
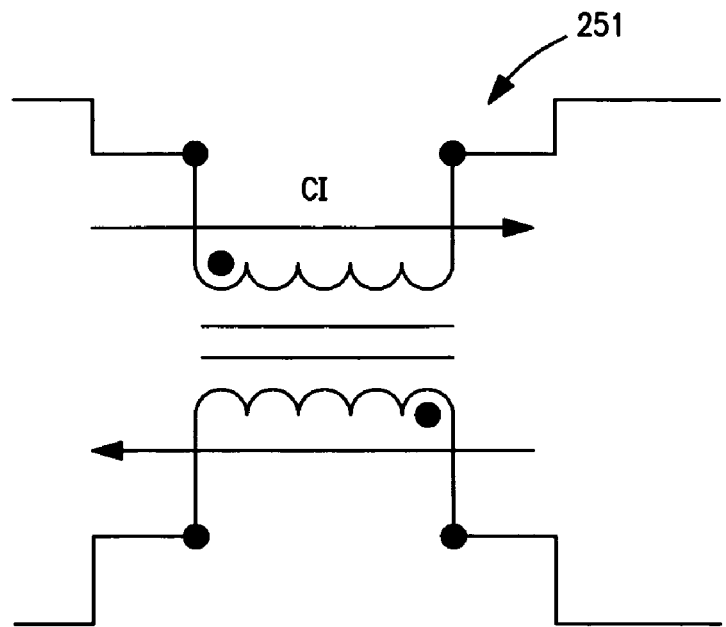
FIG. 3A is a schematic circuit diagram of a coupled inductor operating under the two surge modes described with regards to FIG. 1.
Figure 3A:
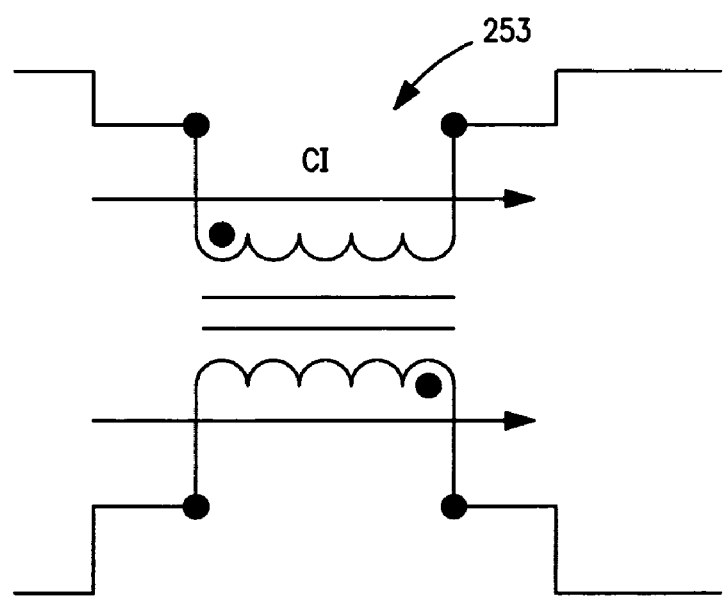

Referring to FIGS. 3-3A, diagrams illustrating both CMI and CI inductive electronic component with corresponding arrows indicating direction of a sudden change in current presented to the terminals are shown. The illustrated circuit 250 shows a common mode inductor experiencing a common mode surge in current. The second circuit 252 illustrates a common mode inductor experiencing a differential mode surge in current. The third circuit 251 (FIG. 3A) illustrates a coupled inductor experiencing a differential mode surge in current, and the fourth circuit 253 illustrates a coupled inductor experiencing a common mode surge in current. The operation of these circuit configurations 250-253 are now discussed in detail with respect to FIGS. 4A-4B.

CMI Surge Protection Operation with Common Mode Surge—

Figure 4A:
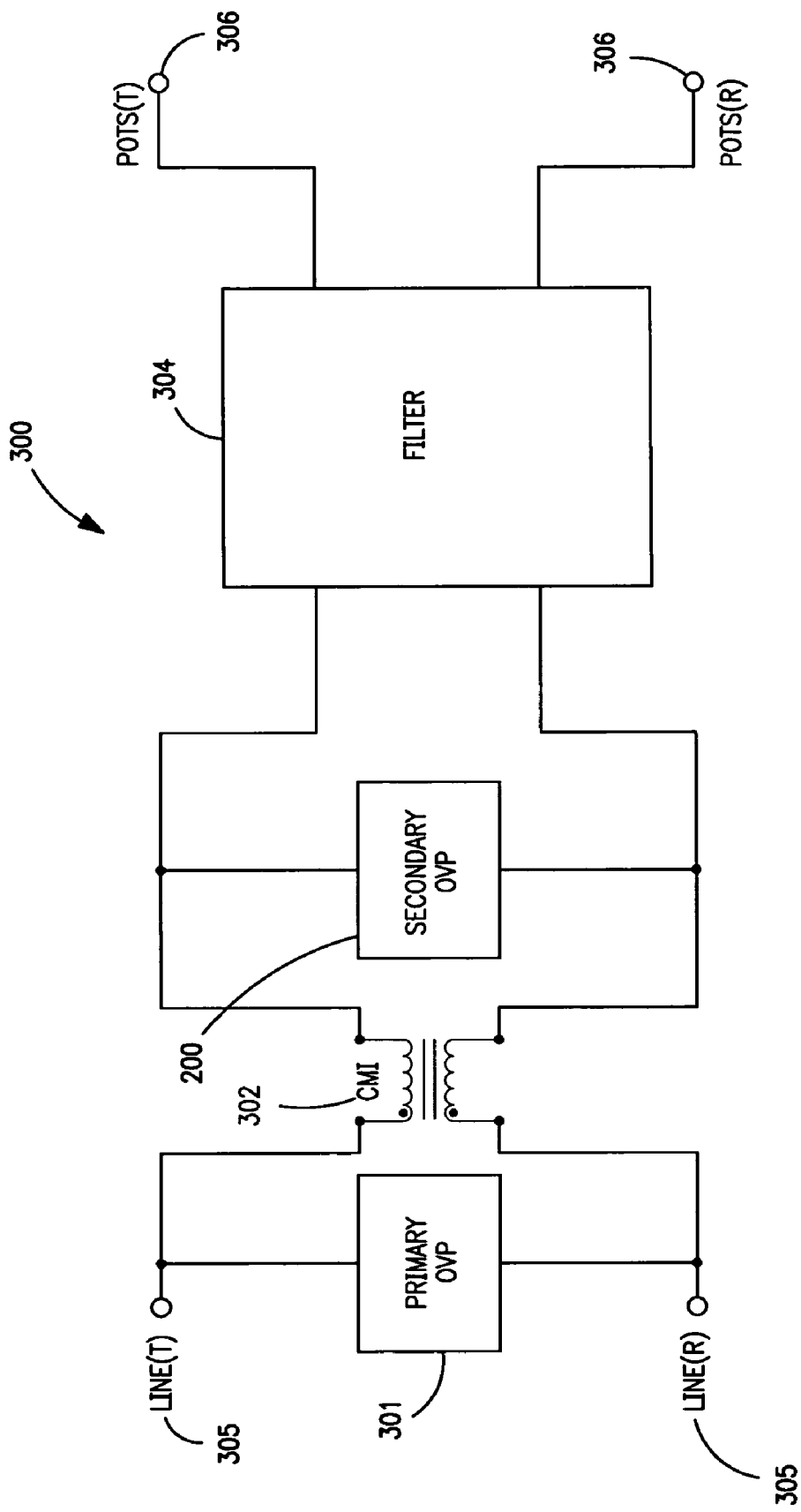
FIG. 4A is a schematic circuit diagram illustrating a common mode inductor mounted in series with a primary and secondary over voltage protection circuit.

Referring now to FIG. 4A, a common mode inductor (CMI) 302 is illustrated as placed in series with a secondary OVP circuit 200 and a primary OVP circuit 301 in circuit 300. In cases where a large common mode surge is present, a large current passes through the terminals 305 of the CMI, the impedance result at the windings is accordingly very large. The combined impedance of the total circuit (i.e. CMI 302, Secondary OVP network 200, and signal conditioning circuitry 304) must therefore be designed large enough to trigger the primary OVP 301. The secondary OVP circuit 200 may be chosen from any number of options, including for example any of the three (3) options delineated in FIGS. 2A-2C.

Referring back to FIG. 2A, in a first option, the OVP circuit 200 includes a single latch element 201 (e.g. a thyristor) that is disposed between a tip node 211 and a ring node 212. As long as the impedance or resistance of the total circuit is large enough, the primary OVP 301 (e.g. a GDT) will be subjected to a voltage large enough to activate it. Assuming that the common mode surge current affects nodes 212 and 211 equally, there would not be a large enough voltage difference to push the latch element 201 into a breakover condition. Consequently, the large impedance contributed by the rapid change in current presented to CMI 302 must be large enough to trigger the primary OVP 301. Since the impedance contributed by the CMI 302 is proportional to the change in current that is passed through the terminals, the signal conditioning circuit 304 may be exposed to a very large current spike.

Referring back to FIG. 2B, the OVP circuit 200 includes two (2) thyristors 201 that share a common node at ground point 223. In this particular instance, the CMI 302 impedance will be the cause of coordination in the circuit. Unlike the first option discussed previously, the mid-earthed thyristor network provides a path to ground which (if properly designed) isolates the filter circuit 304. The impedance created by the current drawn through the CMI 302 and grounded through the thyristors 201 is designed sufficiently large to cause a suitable voltage across the primary OVP 301 so that the OVP is triggered.

In the third option shown at FIG. 2C, the OVP thyristors 201 behave similarly to the thyristors in the second option (FIG. 2B). The addition of an extra thyristor 201 provides no additional functionality to the circuit under the above described conditions, but does turn on to complete the path to ground.

CMI Surge Protection Operation with Differential Mode Surge—

Referring again to FIG. 4A, the CMI 302 is placed in series with a secondary OVP circuit 200 as discussed previously. During a differential mode surge, the impedance of the CMI 302 would largely be negligible. Following the constructs of the secondary OVP circuitry 200 shown in FIGS. 2A-2C, the behavior of the circuitry 300 is described.

In option A (FIG. 2A), the OVP thyristor 201 is between tip 211 and ring 212. During a differential mode surge, wherein the surge is applied to the tip 211, and ground is applied to ring 212, the thyristor 201 will turn on, and conduct the surge current to ground 212. The CMI is insignificant, and only the resistance of the total circuit can be relied upon to provide co-ordination with the primary OVP circuit 301. The inductive device can be designed so that the resistance is suitably large to ensure co-ordination, with a differential surge applied. Ideally, at least one or more components contribute large enough impedance so that the GDT is triggered before any circuit damage occurs.

In option B (FIG. 2B), the OVP thyristors 201 are joined together at ground 223. Depending on which terminal the surge is applied, either of the thyristors 201 will turn on, and conduct the surge current to ground 223. The CMI is insignificant, and only the resistance of the total circuit can be relied upon to provide co-ordination with the primary OVP circuitry 301.

In option C (FIG. 2C), the differential mode behavior of the inductor, along with the earthed ring means that the thyristors 201 will conduct initially, until a suitable fall in voltage across the secondary winding of the CMI 302 occurs. When this happens, the thyristor 206 will start to conduct, and the other thyristor(s) 201 will turn off. As in options A and B, the impedance of the CMI 301 is small, so the only reliable method for coordination with the primary OVP is the resistance of the total circuit.

CI Surge Protection Operation with Common Mode Surge—

Figure 4B:
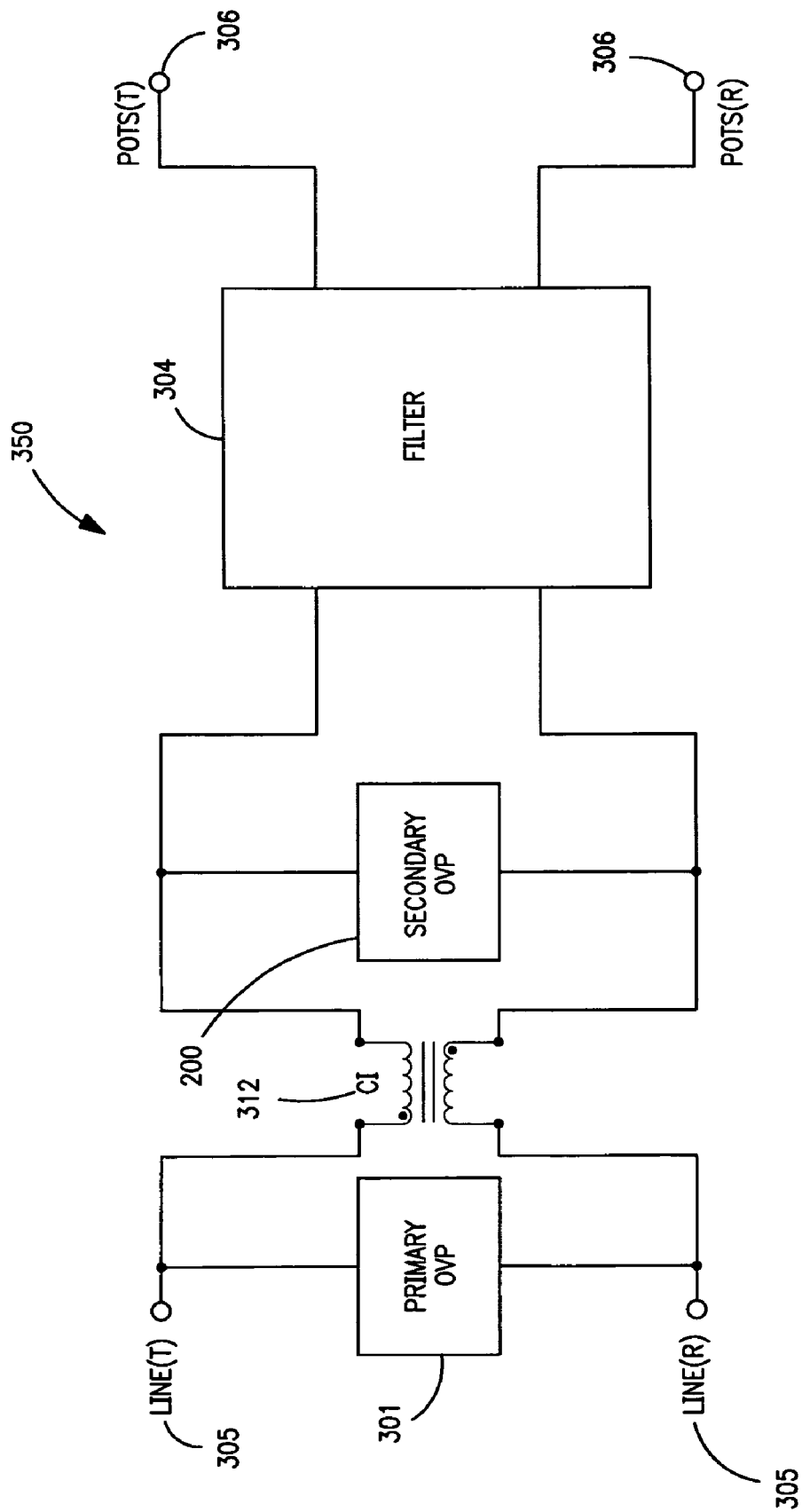
FIG. 4B is a schematic circuit diagram illustrating a coupled inductor mounted in series with a primary and secondary over voltage protection circuit.

Referring to FIG. 4B, the operation of circuit 350 with a coupled inductor (CI) 312 placed in series with a secondary OVP circuit 200 and a primary OVP circuit 301 is shown and described in detail. In modes of operation where a common mode surge presents itself on the line, the impedance of the CI 312 will be negligible. The combined impedance of the circuit (CI 312 and Secondary OVP network 200, and signal conditioning circuitry 304) must be designed large enough to trigger the primary OVP 301. Because the CI 312 has relatively low impedance for common mode surges, only the resistance of the inductor windings and impedance/resistance of the filter circuit will be of use to ensure that coordination occurs. This feature can be addressed during design to ensure that the co-ordination occurs with a differential surge applied.

CI Surge Protection Operation with Differential Mode Surge—

During modes of operation where a differential mode surge presents itself on the line, the impedance of the CI 312 in circuit 350 will be large as the current passes through the CI 312. The secondary OVP circuit 200 may be chosen from any number of OVP circuitry options, for example including those three (3) options previously described herein with respect to FIGS. 2A-2C.

In option A (FIG. 2A), the OVP thyristor 201 is between tip 211 and ring 212. In this surge mode, as the thyristor 201 offers a current path from surge event to ground, a large amount of current is passed through the thyristor. This large current change creates a large impedance in the windings of the CI inductor. If the inductance has been chosen carefully so that it is in the correct frequency range for the surge, a suitably large voltage will appear across the device and this will be of sufficient magnitude to activate the primary OVP circuit 301.

In option B (FIG. 2B), the OVP thyristors 201 are joined together at ground 223. In this particular instance the thyristor 201 will turn on, and conduct the surge current to ground 223. The CI impedance is significant, but the magnitude of the impedance will be less due to the mid-earthed connection through thyristor 201. The circuit should be designed such that it will create a large impedance across the network that will activate the primary OVP circuit 301.

In option C (FIG. 2C), the current through the OVP thyristors 201 is between tip 211 and ring 212. During a differential mode surge, wherein the surge is applied to the tip 211, and ground is applied to ring 212, the thyristor 201 will turn on, and conduct the surge current to ground through either the other thyristor 201, or the alternate thyristor 206. The impedance of CI is significant, and will create a large enough impedance across the network, that will activate the primary OVP circuit 301.

Exemplary Surge Protection Apparatus

Accordingly, the ability to leverage a large current draw in the secondary OVP circuit 200 to trigger the primary OVP circuit 301 (such as by using inductive components) is a highly desirable characteristic in cases where rapid current surges present itself on the line. In cases where filter or signal conditioning circuitry 304 must be protected against both common and differential mode surge events, it is desirable that multiple inductive electronic components with at least primary 301 and secondary 200 OVP circuitry be utilized to prevent damage to the signal conditioning circuitry 304.

Figure 5:
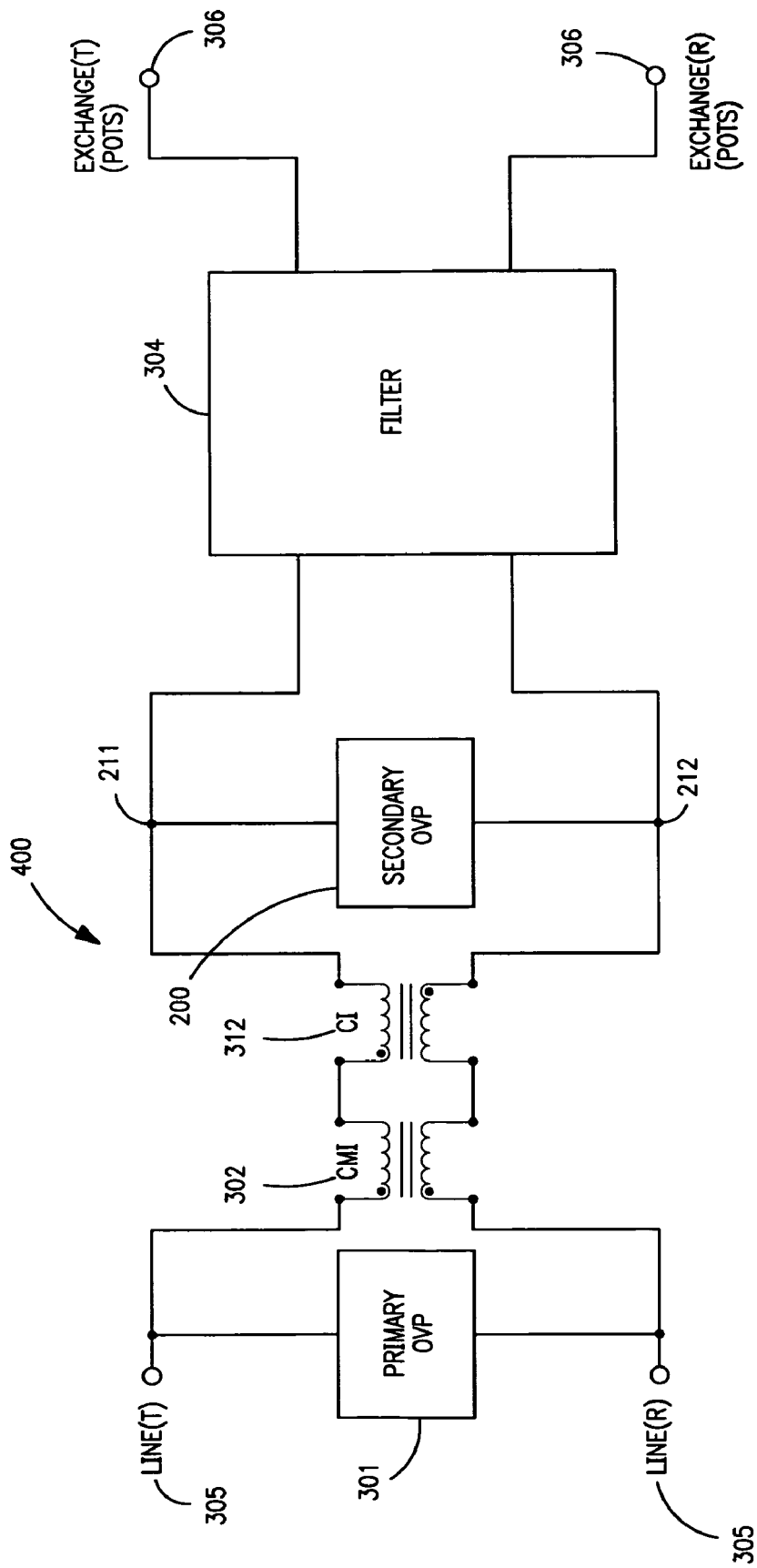
FIG. 5 is a schematic circuit diagram illustrating a first embodiment of a telecommunications over voltage protection circuit apparatus manufactured in accordance with the principles of the present invention useful in, inter alia, CO and remote cabinet applications.

Referring to FIG. 5, a circuit 400 implementing a CMI 302 and a CI 312 and useful in, inter alia, central office (CO) and remote cabinet applications is shown and described in detail. The joint operation of a CMI 302 and CI 312 insure that at least one of the two inductive components presents a large impedance load to the primary OVP circuit 301 during a surge event. In this method, the CMI 302 provides large impedance for triggering the primary OVP circuit 301 during common mode surges, and the CI 312 provides large impedance for triggering the primary OVP circuit 301 during differential mode surges.

In a common mode surge, using secondary OVP circuit option A (FIG. 2A), the CMI 302 will offer a large impedance to the signal, whereas the CI 312 will be very small. Along with the resistance of the network, the voltage generated across the network will be sufficient to activate the primary OVP circuitry 301. The secondary OVP circuitry 200 will not activate.

For a common mode surge using secondary OVP circuit option B (FIG. 2B), the CMI 302 will offer a large impedance, which will turn on the primary OVP circuitry 301. As described before, the large voltage at nodes 211 and 212 will cause both thyristors 201 to turn on and connect to ground, effectively protecting the signal conditioning circuit 304 from a large current surge.

For a common mode surge using secondary OVP circuit 200 option C (FIG. 2C), the CMI 302 will create a large impedance, which will turn on the primary OVP circuit 301.

Like option B (FIG. 2B), all thyristors 201 and 206 will turn on to connect to ground.

In a differential mode surge experienced in circuit 500 using secondary OVP circuit option A (FIG. 2A), the CMI 302 will offer negligible impedance, but the impedance of CI 312 will be large. The resulting voltage will activate the primary OVP circuit 301. Due to the large voltage difference between nodes 211 and 212, the secondary OVP circuit 201 will also turn on.

Using secondary OVP option B (FIG. 2B), the CMI 302 will offer negligible impedance, but the impedance of CI 312 will be large. The resulting voltage will activate the primary OVP circuit 301. In this case, only one thyristor 201 will turn on, allowing a connection to ground. The other thyristor 201 has no voltage drop across it, and remains inactive.

Using secondary OVP option C (FIG. 2C), the CMI 302 will offer negligible impedance, but the impedance of CI 312 will again be large. The resulting voltage will activate the primary OVP circuit 301. Two of the secondary OVP circuit 200 latch elements 201, 206 will turn on allowing a connection to ground through either, the tip or mid-earthed ground.

As demonstrated, the inductive elements CMI 302 and CI 312 ideally provide the circuit 500 with a high impedance component for all common mode and differential mode surge events. Still, other circuit considerations must be taken into account, as non-ideal components introduce additional complexity to circuit design. The presence of inductive elements can also provide sufficient resistance/impedance to cause coordination, yet another a positive "side-effect". Furthermore, sufficient resistance to cause co-ordination may be undesirable in the design for other reasons.

Figure 5A:
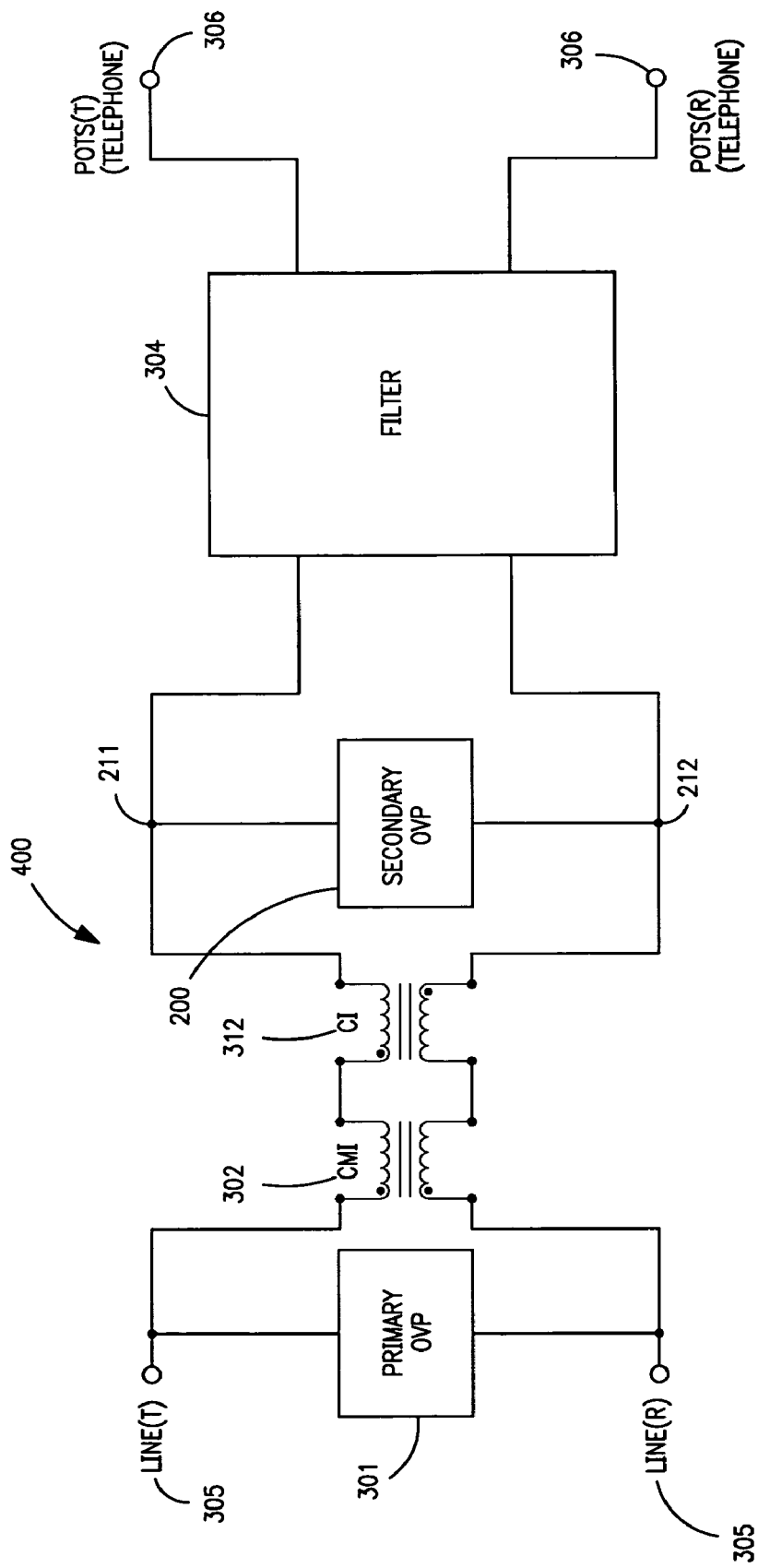
FIG. 5A is a schematic circuit diagram illustrating a first variant of the first embodiment of a telecommunications over voltage protection circuit apparatus manufactured in accordance with the principles of the present invention useful in, inter alia, CPE applications.

FIG. 5A illustrates a variant of the circuit 400 illustrated in FIG. 5. Specifically, the circuit 400 in FIG. 5A is pointedly adapted for customer premises equipment (CPE) applications. The operation of the circuit 400 in FIG. 5A is functionally identical in operation as that previously described, and hence is not described further herein.

Problems with OVP Circuit Coordination Created by Component Tolerances

Figure 6:
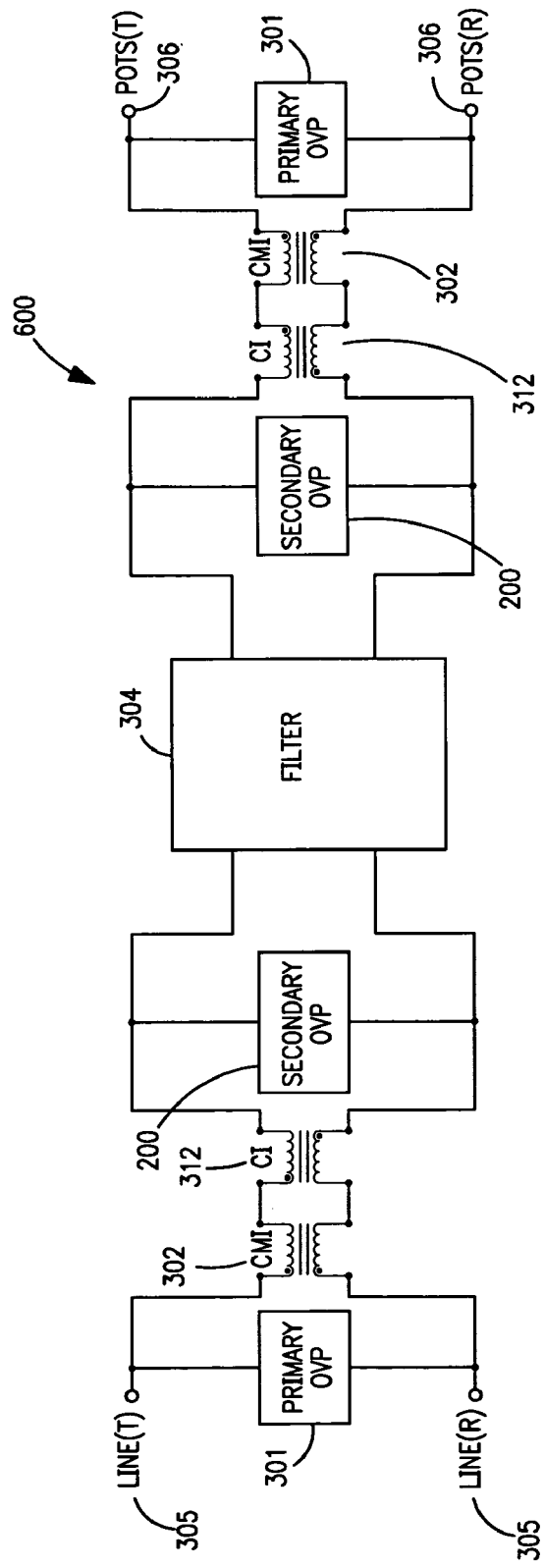
FIG. 6 is a schematic circuit diagram illustrating a first embodiment of a dual sided POTS filter telecommunications over voltage protection circuit apparatus manufactured in accordance with the principles of the present invention useful in, inter alia, CO, CPE and remote cabinet applications.

FIG. 6 shows protective circuitry for a circuit 600, which is composed of two secondary OVP circuits 200 and two primary OVP circuits 301 distributed on both sides of signal conditioning circuit 304. When manufacturing tolerances are introduced, the design of the coordination circuit and the filter necessitates additional considerations. For example, in one embodiment, a 390V condition to prevent damage to the circuit 304 would lead to a selection of 400V secondary OVP circuits 200. This requirement can be met by an individual, or combination of, thyristor networks 200 such as that disclosed in FIGS. 2A-2C. In a sample situation involving component tolerances, one secondary OVP circuit 200 may activate at 410V, and the other secondary OVP circuit 200 at 395V. During a surge event of this case, the primary OVP circuit 301 may reduce damage to the filter circuit 304; however, the first secondary OVP circuit 200 will be active before the other secondary OVP circuit 200 becomes active. The secondary OVP circuits 200 "sandwich" or bracket the filtering circuit 304, and so therefore provides very little benefit. In other words, the first secondary OVP circuit 200 has been bypassed by the other secondary OVP circuit 200, as there is no situation where the other secondary OVP circuit 200 triggers.

This is in certain applications an inherent behavior that in effect cannot be designed out, and instead must be managed. By designing the filter components to a higher safety level, but not to the maximum required (2 kV instead of 4 kV, for example), the primary OVP circuit 301 can be activated to prevent damage. The signal conditioning circuit 304 is designed to work in series with the far-side secondary OVP circuit 200 so as to present a large enough impedance to trigger the primary OVP circuit 301. This ensures that there will be co-ordination between the far-side secondary OVP circuit 200 and the near-side primary OVP circuit 301, and the resistance of the signal conditioning circuit 304. This resistance will dictate at what current level the primary OVP circuit 301 voltage reaches, which will be greater than the standard same-side resistance. Note that as used herein, the terms "far-side" and "near-side" are used strictly in their relative sense, and are not intended to describe a preferred orientation. For example, in the circuit illustrated in FIG. 6, the term "far-side" may be used to describe either the line or POTS side of the circuitry, with the term "near-side" merely being indicative of the opposite side of the circuit with reference to the "far-side".

Furthermore, since the filter components are designed in such a manner as to tolerate the reduced surge currents, the filter will be undamaged at the lower level. Therefore, even though the design was originally intended to have triggered the same side secondary OVP circuit 200 during a surge event, by designing the circuit in such a manner as to tolerate the current passing through the secondary OVP circuit 200, it ensures that overall over voltage protection co-ordination occurs at a significantly lower current in the circuit 600.

The exemplary embodiments of the circuit apparatus and methodologies described above advantageously enable full compliance with the requirements imposed by ITU-T k.45 for overvoltage protection, although it will be appreciated that the apparatus and methods may be designed for other applications, and/or compliance with other standards. An important element of the invention is the usage of inductive components to passively coordinate a primary OVP circuitry with secondary OVP circuitry, ensuring that both fast reaction times are achieved, as well as maximal surge dispersal. A benefit of this approach is that space requirements and component count are reduced (especially since such inductive devices can be made extremely small and for very low cost), hence overall size of the unit and overall cost are reduced.

In addition, the designs described above have the ability to coordinate over-voltage protection on both sides of the filtering circuit, so as to allow for component tolerances. Stated differently, the design can advantageously accommodate circuit elements with less precision/greater tolerance while still achieving the desired goals of fast reaction and surge dispersal, thereby allowing such circuit elements to be less costly (since higher precision/lower tolerance generally correlates to higher cost).

Methods of Manufacture

Figure 7:
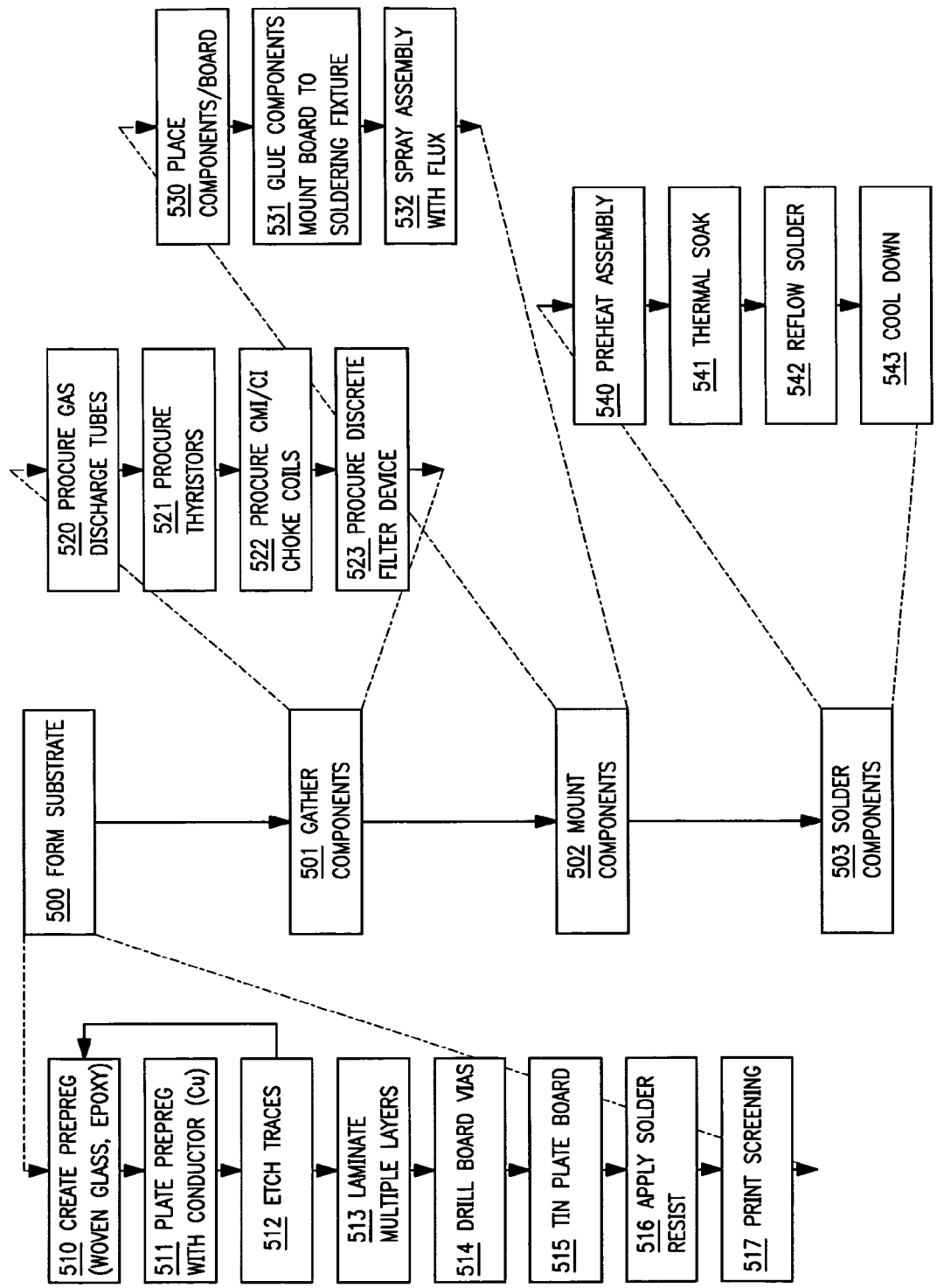
FIG. 7 is a logical flow diagram illustrating an exemplary method for manufacturing the telecommunications over voltage protection circuit apparatus of, inter alia, FIG. 5.

An exemplary embodiment of the method of construction of protection circuit of the invention is illustrated in FIG. 7. The steps involved in construction of the circuit using discrete components, and commonly used technology for circuit board manufacture, is illustrated; however, other approaches may be substituted.

The primary steps of construction are: (i) formation of the substrate at step 500, (ii) gathering of the components at step 501, (iii) placement of the components upon the substrate at step 502, and (iv) finally soldering the components to the substrate at step 503.

Formation of a substrate (e.g., PCB or the like) is well known in the electronic arts. In one exemplary embodiment, the substrate is formed from a layer of woven fiberglass and epoxy commonly referred to as "prepreg" at step 510. The prepreg is layered with copper sheeting at step 511. At this point the layer of copper is etched away so as to leave only "traces", or circuit pathways at step 512. This process is repeated and the subsequent layers are laminated together to create one multi-layer board with circuit pathways embedded within it at step 513. Any pathways that must hop from layer to layer, are drilled through, and plated, creating a "via" at step 514. The board is plated with tin or similar material to prevent long term oxidation to the exposed traces at step 515. Solder resist is applied to areas of the board, where necessary at step 516. Lastly, any screen printing is done to the board at step 517. Other methods of substrate manufacture which are commonly used include: material variations (e.g. use of ceramic), and the use of breadboards rather than PCBs are contemplated as well.

At step 501, the gathering of components requires the procuring of the various components used in the design. Gas Discharge Tubes are composed of a series of electrodes within non-conducting gas, are commonly used and procured at step 520. Thyristors are typically multi-(e.g., 4) layered alternating N and P-type silicon components, and are commonly sold as discrete or leaded components and procured at step 521. CMI and CI components are, in one embodiment, a ferrite based core with windings and are procured at step 522. The filter circuitry, which may be a plurality of passive and/or active components are procured at step 523. It should be noted that various ones of the above-described components may be procured as described above, or manufactured in house. Other components with equivalent properties may be used as substitutes.

It is also noted that a part of the component procurement process may include evaluation/selection of components with proper physical attributes such as tolerance. As noted above, the exemplary embodiments of the present invention advantageously allow for reduced tolerance of components by virtue of the design; however, depending on the requirements of a particular application, there may be a need for components with more or less tolerance/precision. Hence, in one variant, the circuit behavior is modeled as part of the design process (such as via a computer-based design program such as the well-known Matlab™ or Labview™ programs) in order to estimate actual circuit behavior, and hence determine the level of component tolerance or precision that may be required for a particular application given any constraints.

Mounting of components (step 502) requires that the corresponding components are placed onto the printed circuit board at step 530. Components which require glue, silicone sealant or adhesive (components on the underside of the board, very small components, etc.) are in the illustrated embodiment affixed to the board before the board is mounted into a soldering fixture at step 531. Lastly, the board assembly is coated with flux, to aid in proper soldering at step 532.

Next, the components are soldered to the substrate at step 503. The board assembly in fixture is preheated at step 540. Preheating prevents component damage from thermal shock. It also contributes to burning off any impurities that exist in the flux. Next the board assembly is allowed a short period of thermal soak; wherein the flux is activated at step 541. The board assembly is then cooked at the reflow temperature the solder is melted, and joins the components to the board at step 542. Lastly the board is allowed to cool, so as to prevent thermal shock, and provide the best solder joint formation at step 543. Other methods of soldering are applicable to this process, including but not limited to hand soldering, wave soldering and the like.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A surge protected system, comprising:
    first and a second primary over-voltage protection circuits;
    first and a second common mode inductors;
    first and a second coupled inductors, said coupled inductors comprising coils that are magnetically coupled to each other;
    first and a second secondary over-voltage protection circuits; and
    a signal conditioning circuit;
    wherein said first secondary over-voltage protection circuit is disposed at a first side of said signal conditioning circuit, and said second secondary over-voltage protection circuit is disposed at an opposite side of said signal conditioning circuit;
    wherein said first primary over-voltage protection circuit is disposed at a first side of said signal conditioning circuit, and said second primary over-voltage protection circuit is disposed at an opposite side of said signal conditioning circuit;
    wherein said first common mode inductor is disposed at a first side of said signal conditioning circuit, and said second common mode inductor is disposed at an opposite side of said signal conditioning circuit; and
    wherein said first coupled inductor is disposed at a first side of said signal conditioning circuit, and said second coupled inductor is disposed at an opposite side of said signal conditioning circuit.

2. The surge protected system of claim 1, wherein each of said first and second primary over-voltage protection circuits comprises a gas discharge tube.

3. The surge protected system of claim 2, wherein each of said first and second secondary over-voltage protection circuits comprises one or more thyristor components.

4. The surge protected system of claim 1, wherein said surge protection apparatus is compliant with the ITU-T k.45 standard.

5. The surge protected system of claim 1, wherein the signal conditioning circuit is configured to work in series with the first secondary over-voltage protection circuit disposed at the first side of said signal conditioning circuit so as to present a large enough impedance to trigger the opposite side primary over-voltage protection circuit during a surge event.

6. The surge protected system of claim 5, wherein the first side comprises a line side of the surge protected system.

7. The surge protected system of claim 5, wherein the first side comprises a plain old telephone service (POTS) side of the surge protected system.

8. A surge protected system, comprising:
first and a second primary over-voltage protection circuits;
first and a second common mode inductors;
first and a second magnetically coupled inductors;
first and a second secondary over-voltage protection circuits; and
a signal conditioning circuit;
wherein said first secondary over-voltage protection circuit is disposed at a first side of said signal conditioning circuit, and said second secondary over-voltage protection circuit is disposed at an opposite side of said signal conditioning circuit; and
wherein said first magnetically coupled inductor is disposed at the first side of said signal conditioning circuit, and said second magnetically coupled inductor is disposed at the opposite side of said signal conditioning circuit.

9. The surge protected system of claim 8, wherein said first primary over-voltage protection circuit is disposed at the first side of said signal conditioning circuit, and said second primary over-voltage protection circuit is disposed at the opposite side of said signal conditioning circuit.

10. The surge protected system of claim 8, wherein said first common mode inductor is disposed at the first side of said signal conditioning circuit, and said second common mode inductor is disposed at the opposite side of said signal conditioning circuit.

11. The surge protected system of claim 8, wherein each of said first and second primary over-voltage protection circuits comprises a gas discharge tube.

12. The surge protected system of claim 8, wherein each of said first and second secondary over-voltage protection circuits comprises one or more thyristor components.

13. The surge protected system of claim 8, wherein said surge protection apparatus is compliant with the ITU-T k.45 standard.

14. The surge protected system of claim 13, wherein the signal conditioning circuit is configured to work in series with the first secondary over-voltage protection circuit disposed at the first side of said signal conditioning circuit so as to present a large enough impedance to trigger the opposite side primary over-voltage protection circuit during a surge event.

15. The surge protected system of claim 14, wherein the first side comprises a line side of the surge protected system.

16. The surge protected system of claim 14, wherein the first side comprises a plain old telephone service (POTS) side of the surge protected system.

17. A surge protected system, comprising:
first and a second primary over-voltage protection circuits;
first and a second common mode inductors;
first and a second magnetically coupled inductors;
first and a second secondary over-voltage protection circuits; and
a signal conditioning circuit;
wherein said first secondary over-voltage protection circuit is disposed at a first side of said signal conditioning circuit, and said second secondary over-voltage protection circuit is disposed at an opposite side of said signal conditioning circuit;
wherein said first primary over-voltage protection circuit is disposed at the first side of said signal conditioning circuit, and said second primary over-voltage protection circuit is disposed at the opposite side of said signal conditioning circuit; and
wherein said first magnetically coupled inductor is disposed at the first side of said signal conditioning circuit, and said second magnetically coupled inductor is disposed at the opposite side of said signal conditioning circuit, 18. The surge protected system of claim 17, wherein said first common mode inductor is disposed at the first side of said signal conditioning circuit, and said second common mode inductor is disposed at the opposite side of said signal conditioning circuit.

19. The surge protected system of claim 18, wherein each of said first and second primary over-voltage protection circuits comprises a gas discharge tube.

20. The surge protected system of claim 17, wherein each of said first and second secondary over-voltage protection circuits comprises one or more thyristor components.

21. The surge protected system of claim 17, wherein said surge protection apparatus is compliant with the ITU-T k.45 standard.

22. The surge protected system of claim 21, wherein the signal conditioning circuit is configured to work in series with the first secondary over-voltage protection circuit disposed at the first side of said signal conditioning circuit so as to present a large enough impedance to trigger the opposite side primary over-voltage protection circuit during a surge event.

23. The surge protected system of claim 22, wherein the first side comprises a line side of the surge protected system.

24. The surge protected system of claim 22, wherein the first side comprises a plain old telephone service (POTS) side of the surge protected system.

25. A surge protected system, comprising:
first and a second primary over-voltage protection means;
first and a second common mode inductors;
first and a second magnetically coupled inductors;
first and a second secondary over-voltage protection means; and
means for signal conditioning;
wherein said first secondary over-voltage protection means is disposed at a first side of said means for signal conditioning, and said second secondary over-voltage protection means is disposed at an opposite side of said means for signal conditioning; and
wherein said first magnetically coupled inductor is disposed at the first side of said means for signal conditioning, and said second magnetically coupled inductor is disposed at the opposite side of said means for signal conditioning.

* * * * *